(12) United States Patent
Langford

(10) Patent No.: US 12,547,938 B2
(45) Date of Patent: Feb. 10, 2026

(54) CORRELATION-BASED DIMENSIONAL REDUCTION OF SYNTHESIZED FEATURES

(71) Applicant: Capital One Services, LLC, McLean, VA (US)

(72) Inventor: Michael Langford, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 720 days.

(21) Appl. No.: 17/935,552

(22) Filed: Sep. 26, 2022

(65) Prior Publication Data

US 2024/0104421 A1  Mar. 28, 2024

(51) Int. Cl.
*G06F 16/00* (2019.01)
*G06N 3/08* (2023.01)
*G06N 20/00* (2019.01)

(52) U.S. Cl.
CPC .............. *G06N 20/00* (2019.01); *G06N 3/08* (2013.01)

(58) Field of Classification Search
CPC ........ G06N 20/00; G06N 20/20; G06N 20/10; G06N 3/08; G06N 5/01; G06N 5/045; G06N 5/04; G06N 3/09; G06N 5/02; G06N 3/006; G06N 3/04; G06N 5/022; G06N 7/01; G06F 16/24578; G06F 16/278; G06F 16/285; G06F 16/9027; G06F 16/906; G06F 16/907; G06F 18/10; G06F 18/2115; G06F 18/2135; G06F 18/214; G06F 16/26; G06F 16/36; G06F 17/18; G06F 18/241; H04L 41/0631; H04L 41/16; H04L 43/0823
See application file for complete search history.

(56) References Cited

U.S. PATENT DOCUMENTS

| 2019/0166024 | A1* | 5/2019 | Ho ..................... H04L 43/0823 |
| 2020/0349467 | A1* | 11/2020 | Teague ................. G06F 16/278 |
| 2022/0101190 | A1* | 3/2022 | Kanter ................. G06F 16/285 |

* cited by examiner

*Primary Examiner* — Shyue Jiunn Hwa
(74) *Attorney, Agent, or Firm* — Foley & Lardner LLP

(57) ABSTRACT

A method includes obtaining a first dataset comprising a first set of features and generating a second set of features based on the first set of features set by providing the first dataset to feature primitive stacks that respectively corresponds to features of the second set of features. The method further includes determining a reduced feature set based on the second set of features and a count of correlation values between features of the second set of features, wherein the correlation values satisfy a correlation threshold. The method further includes storing the reduced feature set in a database in association with the first set of features based on a determination that a second dataset comprising the reduced feature set satisfies a set of criteria.

20 Claims, 4 Drawing Sheets

CORRELATION-BASED DIMENSIONAL REDUCTION OF SYNTHESIZED FEATURES

BACKGROUND

Training data can serve as a critical asset for various learning models and applications dependent on those learning models. A supervised machine learning model can use a dataset to predict various outcomes, label data with one or more classes, etc. A dataset may include multiple data objects, where each data object includes feature values corresponding with a set of features of the dataset. A computer system can use the training data to train a machine learning model by configuring parameters of the machine learning model to output predictions that match one or more features or classes associated with the data objects.

SUMMARY

Developing insights from data can be a critical aspect of analytics and predictive operations. In many types of operations, acquiring such insights may require significant experimentation and data analysis. In many cases, the sheer number of combinations and confounding factors in real-world values may be high barriers to pattern recognition or other types of insight development. Some systems apply automated feature generation subsystems that implement deep algorithms to synthesize new features from a first dataset, where these newly synthesized features may yield insights into correlations or patterns that may have gone unnoticed in an unprocessed dataset. Unfortunately, many of the synthesized features are effectively repetitive with respect to each other or to the data in the first dataset. Without a means of managing synthesized features, feature generation operations based on deep feature synthesis will result in a plethora of additional noise or repetitive data without any corresponding increase in predictive capability.

Some embodiments may overcome this technical problem by applying feature extraction or other dimension-reducing operations to datasets that include synthesized features. Some embodiments may obtain a first dataset having a first feature set and synthesize a set of synthesized features from the first feature set by providing the first dataset to one or more feature primitive stacks. Each feature primitive stack may represent a sequence of operations that, when applied to a feature or set of features, output a set of values to be used as synthesized feature values for a corresponding synthesized set of synthesized features. Some embodiments may then determine a correlation matrix indicating correlations between pairs of features of the synthesized set and then determine a count of correlation values of the correlation matrix that satisfy a user-defined correlation threshold. Some embodiments may then extract a reduced synthesized set from the synthesized set based on this count of correlation values and generate a modified dataset from the first dataset based on the reduced synthesized set. Some embodiments may then store the modified dataset, features of the modified dataset, or a pipeline identifying the operations used to generate the modified dataset for further feature generation or training operations.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

Figure 1:
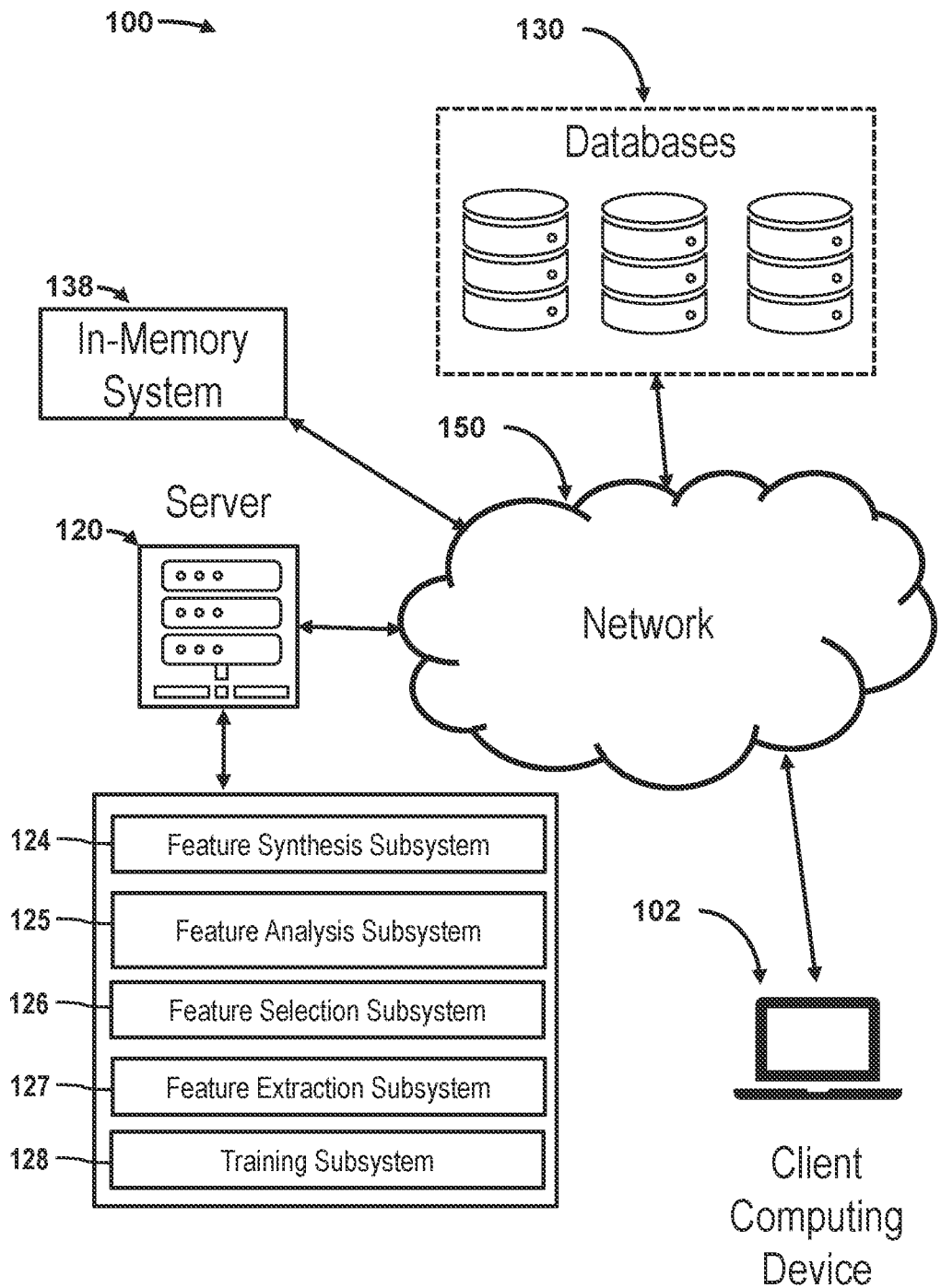
FIG. 1 shows an illustrative computer system for determining a new set of features, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Modern applications derive significant benefits from machine learning operations. In turn, these machine learning operations require significant volumes of data and the expertise required to derive meaning from this data. Gigabytes, terabytes, or even petabytes worth of data may sit unused or underused due to a lack of available expertise. Furthermore, such data may often be stored in inefficient ways. For example, many datasets may include data objects that have multiple features, where at least a pair or more of features of the dataset are highly correlated and thus offer little additional insight for a machine learning operation. Systems that use datasets having too many features for training a machine learning model may waste a significant amount of computational resources and time.

Typical systems may overcome this expertise gap by synthesizing (i.e., creating) new features using deep feature synthesis, where implementing deep feature synthesis operations may include providing a stack of feature primitives with a set of feature values to synthesize a new feature. As used in this disclosure, a stack of feature primitives (i.e., "feature primitive stack," "primitive stack," "stack of primitives") may represent a sequence of feature primitives, where providing an input to the feature primitive stack may cause each feature primitive operation of the feature primitive stack to be performed in an order specified by the feature primitive stack. For example, a feature primitive stack may include first and second feature primitive operators in a sequence and may indicate that the second feature primitive operator is to be performed on a result of the first feature primitive operator. Furthermore, a feature may be a synthesized feature if feature values of the synthesized feature are transformed or otherwise generated from another feature values. For example, some embodiments may provide feature values of a first feature to first and second feature primitive operators representing a transformation operation. In some embodiments, the sequence of the first and second feature primitive operators may output a set of feature values of a synthesized feature, where the synthesized feature may be described as being synthesized based on the first feature.

As used in this disclosure, a feature primitive may represent a transformation operation that uses values of one or more features to synthesize a new feature. For example, a feature primitive may include an addition operator that adds feature values from the same feature, where some embodiments may use the resulting sum as a synthesized feature. While a feature primitive may include an addition operator that adds values of one feature, a feature primitive may include other types of operators or operate on values of multiple features. For example, a feature primitive may include a multiplication operator to multiply feature values from different features, a division operator that divides a sum of features, delta operator to determine differences between two consecutive feature values of a feature, a mean average operator to determine the mean of a plurality of feature values, a max operator to determine the maximum value of a plurality of feature values, a min operator to determine the minimum value of a plurality of feature values, etc.

In some cases, an uncontrolled attempt to implement feature synthesis may exacerbate the curse of dimensionality for various types of high-volume data. This uncontrolled use of feature synthesis may result in large volumes of high-dimension data that provide no more insight than random noise. In some embodiments, the number of dimensions may represent a feature of a dataset, where the dimensionality of a dataset may include a count of both the non-synthesized and synthesized features of the dataset. Some embodiments may overcome dimensionality issues or other issues associated with deep feature synthesis by using a correlation matrix or other operations described in this disclosure. Some embodiments may first synthesize multiple new features using multiple stacks of feature primitives and then reduce the dimensionality of the resulting dataset. Some embodiments may reduce the dimensionality of the resulting dataset based on correlation relationships between the synthesized data. Furthermore, some systems may implement a loop that repeatedly modifies a dataset by synthesizing new features using deep feature synthesis operations described in this disclosure, which reduces the dimensionality of the modified dataset, and then performs data synthesis operations.

FIG. 1 shows an illustrative computer system for determining a new set of features, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 124-128. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an API of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as collected data stored in a dataset, derived values based on the collected data (e.g., synthesized features), machine learning model parameters, classes (where a class may be treated as a feature of a data object), etc. For example, data objects of the set of databases 130 may include communications from users, device health logs, tokens, etc. As used in this disclosure, a "data object" may refer to any type of data object that includes a set of feature values for a set of features, such as a row of a matrix, a set of transactions of a transaction dataset, a record of a database management system (DBMS) database, etc.

In addition, the client computing device 102 or the server 120 may access data stored in an in-memory system 138, where the in-memory system may include an in-memory data store that stores data in a key-value data store such as Redis™. Some embodiments may store learning model parameters, learning model results, or other data in an in-memory data store to accelerate data retrieval or learning model operations.

In some embodiments, a feature synthesis subsystem 124 may perform feature synthesis based on preprocessing operations on one or more datasets. The feature synthesis subsystem 124 may generate new features by using stacks of feature primitives. A feature primitive may be in operation that can be applied to datasets to generate additional features. A feature primitive stack may include any combination of feature primitives. For example, some embodiments may use the feature synthesis subsystem 124 to synthesize a new feature by sequentially adding or multiplying different feature values of a dataset.

Some embodiments may use more sophisticated feature synthesis implementations, such as stacks of feature primitives that have been selected using a genetic algorithm. For example, some embodiments may generate a plurality of first feature primitive stacks and apply a genetic algorithm to develop new sets of feature primitive stacks. Some embodiments may apply a genetic algorithm by using the plurality of first feature primitive stacks to generate a corresponding plurality of feature values for each data object of a dataset. Some embodiments may then determine fitness scores for each generated feature based on their corresponding feature values. After determining fitness scores for the features, some embodiments may select a subset of the set of feature primitive stacks based on their corresponding synthesized feature's fitness scores. Some embodiments may then generate additional feature primitive stacks based on the subset of the set of feature primitive stacks. For example, some embodiments may generate an additional feature primitive stack by (i) copying a first feature primitive stack of the subset and adding a new feature primitive to the copied stack, (ii) changing a numeric parameter of an operator of the copied stack, removing a feature primitive from the copied stack, or (iii) switching an existing feature primitive of the stack with a new feature primitive. Some embodiments may then analyze the feature values of each synthesized feature to determine a fitness score. Some embodiments may then select a subset of the set of feature primitive stacks based on their corresponding synthesized feature's fitness scores. Various fitness score functions may be used to determine a fitness score, such as a function that provides a numeric score indicating a synthesized feature's predictive capability for a binary or categorical classification, a synthesized feature's variance, etc.

Some embodiments may use a feature analysis subsystem 125 to determine a set of scores usable for later operations, such as dimension-reducing operations. Furthermore, some embodiments may use the feature analysis subsystem 125 to determine a set of correlation values and then use the set of correlation values to count a number of sufficiently unique features. For example, some embodiments may use the feature analysis subsystem 125 to determine a correlation matrix that indicates the correlation between pairs of synthesized features. Alternatively, or additionally, some embodiments may, after synthesizing features based on a first dataset, generate a correlation matrix that indicates correlations between pairs of synthesized features and between synthesized features and any original features of the first dataset. Some embodiments may then use the set of correlation values to determine a count of correlation values that satisfy a correlation threshold, where the correlation threshold may be a pre-determined correlation threshold. Alternatively, some embodiments may obtain a user-defined correlation threshold that a user input during application execution. For example, some embodiments may determine a count of correlation values that are less than 0.75 and use this count of correlation values when reducing the dimensions of a dataset.

Some embodiments may use the feature analysis subsystem 125 to generate additional scores to associate with features of a dataset. For example, as described elsewhere in this disclosure, some embodiments may determine a set of fitness scores for features of a dataset. Some embodiments may further use the feature analysis subsystem 125 to determine scores indicating a confidence or priority associated with the feature, where the scores may then be used during feature selection operations. For example, some embodiments may assign confidence values representing a degree of confidence to each feature of a dataset, where a synthesized feature derived from a set of first features may be set to have the confidence associated with lowest confidence value of a first feature used to generate the synthesized feature.

Some embodiments may use the feature analysis subsystem 125 to generate additional values to substitute a feature value prediction into empty feature values of a data object. For example, some embodiments may determine a measure of central tendency (e.g., a mean average, a median, a mode, etc.) of a first feature for a dataset and use the measure of central tendency as a feature value prediction. Some embodiments may then determine that a feature value for this first feature is empty for a first record of the dataset. In response to a determination that the feature value for this first feature is empty, some embodiments may then substitute the empty feature value with the measure of central tendency or another feature value prediction.

Some embodiments may generate a set of features that includes synthesized features using a feature selection subsystem 126. Some embodiments may select a subset of features for further analysis, machine learning model training, etc., based on a set of scores. For example, some embodiments may determine a selection of features by limiting the total number of selected features to the count of correlation values that satisfy the correlation threshold. Some embodiments may select which specific features of a set of features to retain for an analysis operation, learning operation, or another type of operation based on a fitness score, priority score, or other score associated with a feature.

By selecting a subset of features from a dataset, some embodiments are effectively reducing the dimensionality of a dataset. For example, some embodiments may reduce the dimensionality of a dataset from 25 dimensions to 10 dimensions. It should be understood in this disclosure, that some embodiments may reduce the dimensions of a dataset by selecting dataset features. Alternatively, some embodiments may reduce the dimensions of a dataset by performing feature extraction operations, as described elsewhere in this disclosure.

Some embodiments may use a feature extraction subsystem 127 to generate a reduced dataset having an associated reduced set of features based on a modified dataset. Some embodiments may apply a set of operations to a dataset that includes first set of features and a set of synthesized features that reduce the dimensions of the dataset. In some embodiments, the extent of a dimension reduction process may be based on a count of correlation values. For example, a computing system may first determine that a modified dataset having 25 features has a corresponding count of correlation values, where the count of correlation values is equal to 10. In response, it may reduce the dimensions of the modified dataset from 25 to 10 using a feature extraction sub system 127.

Some embodiments may synthesize new features to update a dataset and apply feature extraction operations to reduce the dimensionality of the modified dataset without performing feature selection operations. Alternatively, some embodiments may synthesize the new features to update the dataset and apply feature selection operations to reduce the dimensionality of the modified dataset without performing feature extraction operations. Some embodiments may choose between feature selection, feature extraction, other dimension-reducing operations, some combination thereof, etc., based on the total number of dimensions for a modified dataset. For example, some embodiments may perform principal component analysis (PCA) to reduce the number of features of a modified dataset to a count of correlation scores that satisfy a correlation threshold in response to a determination that the total number of features of a dataset is less than a selection threshold. In response to a determination that the total number of features is greater than the selection threshold, some embodiments may apply additional dimension-reducing operations, such as a feature selection operation. Furthermore, some embodiments may receive a user-provided feature reduction parameter and use the user-provided feature reduction parameter when determining a number of dimensions that a dataset should be reduced to when using a dimension-reducing operator.

Some embodiments may implement a recursive or iterative loop that causes a computer system to perform feature synthesis operations and dimension-reducing operations until a set of termination criteria is satisfied. In some embodiments, a determination criterion may include that a preset number of iterations have been performed. For example, some embodiments may receive a user-inter-value equal to five and, in response, perform a sequence of operations five times, where the sequence of operations includes a feature synthesis operation and a feature extraction operation.

Figure 2:
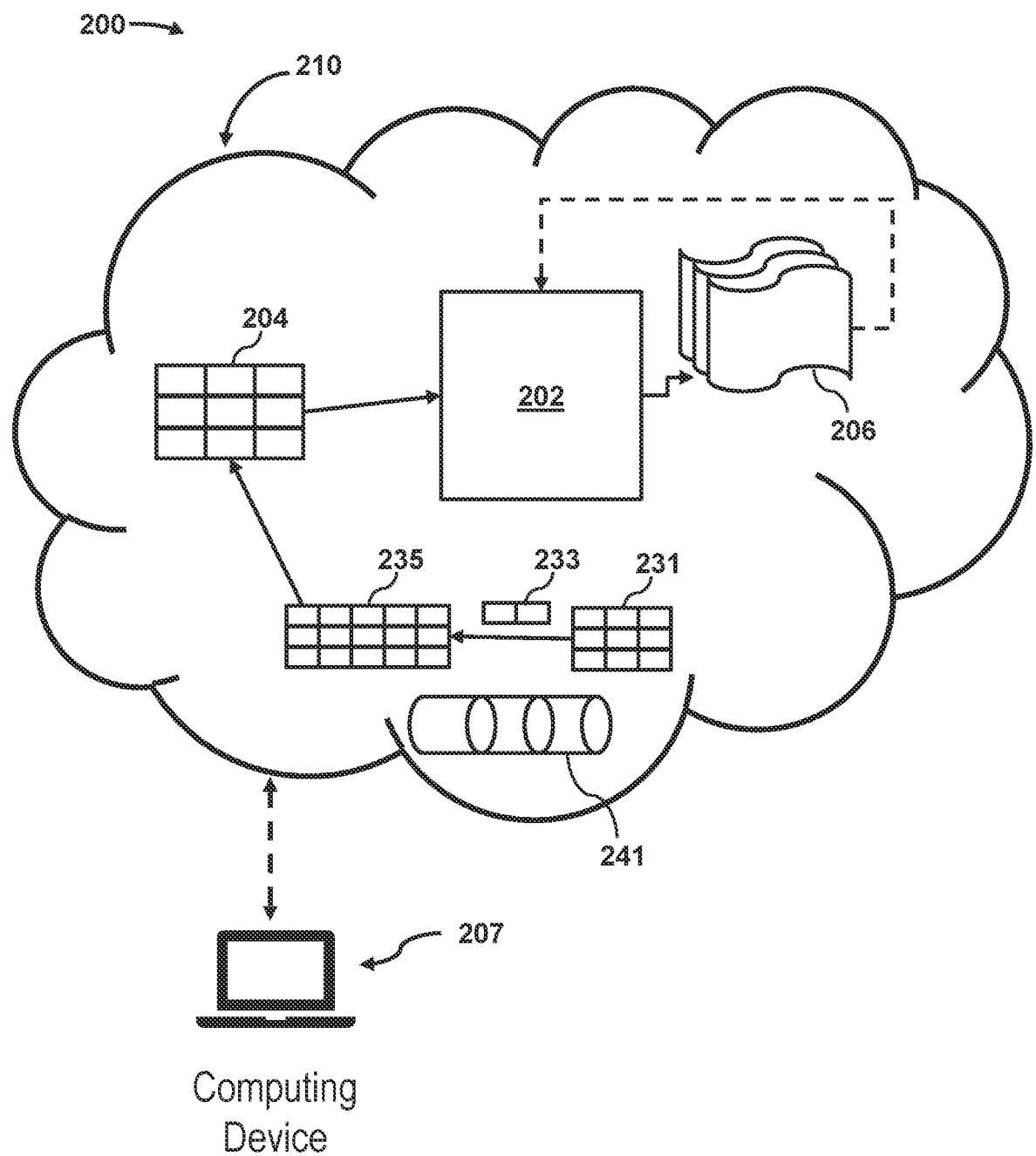
FIG. 2 shows an illustrative diagram of a machine learning model trained on a dataset with synthesized features, in accordance with one or more embodiments.

FIG. 2 shows an illustrative diagram of a machine learning model trained on a dataset with synthesized features, in accordance with one or more embodiments. A system 200 may include computing device 207, where the computing device 207 may be any computing device, including, but not limited to a smartphone, a laptop computer, etc. FIG. 2 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may synthesize new features to update datasets, dimensionally reduce the modified datasets, or train machine learning models based on the dimensionally reduced datasets using the cloud system 210.

Some embodiments may update a first dataset 231 with synthesized features 233 to produce a modified dataset 235 and then dimensionally reduce the modified dataset 235 to produce the input dataset 204. The input dataset 204 may include only the synthesized features 233, only features of the first dataset 231, or some combination thereof. Some embodiments may then train a first machine learning model 202 of the cloud system 210 with the input dataset 204. Some embodiments may train a first machine learning model 202 based on the input dataset 204 and train a second machine learning model based on the first dataset 231.

In some embodiments, the first machine learning model 202 may take input dataset 204 and provide outputs 206. The first machine learning model 202 may include a neural network model that includes an input layer and a set of hidden layers. Each neural unit of the first machine learning model 202 may be connected with many other neural units of the first machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, the first machine learning model 202 may update its model parameters (e.g., weights, biases, or other parameters) based on the outputs 206 during a training operation or during another type of operation. In some embodiments, such as where the first machine learning model 202 is a neural network, connection weights may be adjusted to reconcile differences between the neural network's prediction and reference feedback. The first machine learning model 202 may include multiple layers (e.g., where a signal path traverses from front layers to back layers). In some embodiments, the first machine learning model 202 may use backpropagation techniques, where forward stimulation is used to reset weights on the "front" neural units. For example, one or more neural units (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the first machine learning model 202 may be trained to generate better predictions. In some embodiments, stimulation and inhibition operations for the first machine learning model 202 may be more free-flowing, with connections interacting in a more chaotic and complex fashion.

Some embodiments may determine an accuracy for a machine learning model when assessing the machine learning model. An accuracy may represent a ratio of the number of times that a learning model output matches an expected result of a testing input. In some embodiments, the matching may be performed as a binary determination. For example, some embodiments may determine that an expected output and a learning model output match if they equal each other and determine that the expected output and the learning model output do not match if the two values are not equal. Alternatively, some embodiments may determine that a learning model output generated from a testing input may partially match with an expected result of the testing input based on the difference between the learning model output and the expected result. For example, if a learning model output determined with a test input is "0.49," and the expected result for the test input is "0.50," some embodiments may determine that the model output is 98% accurate with respect to the test input. Some embodiments may then determine an accuracy for a machine learning model based on the matching results for each test input of a set of test inputs. While the above may measure partial accuracy as a ratio of a difference and the expected value, some embodiments may measure partial accuracy in other methods, such as by determining a square of differences between an expected output and a learning model output, a log of the differences, etc.

Some embodiments may compare the predictive capability of the first machine learning model 202 with the second machine learning model using a test dataset to determine whether the first machine learning model 202 has an accuracy that satisfies an accuracy threshold, where the accuracy threshold may be based on the accuracy of the second machine learning model. For example, if the second machine learning model has an accuracy of 80% on a test dataset, some embodiments may determine that the first machine learning model 202 satisfies an accuracy threshold if the accuracy of the first machine learning model is 80% or greater when testing the accuracy of the first machine learning model 202 using the test dataset. In response to a determination that the first machine learning model 202 satisfies an accuracy threshold, some embodiments may store the input dataset 204 in association with the first dataset 231 or the first machine learning model 202. It should be noted that, while some embodiments may describe accuracy in terms of percentages, other embodiments may compute accuracy as normalized values between 0 and 1.0, fractions, or other ratios. For example, some embodiments may set an accuracy threshold to be equal to 0.9.

Some embodiments may store the operations used to generate the input dataset 204 in a pipeline 241, where the pipeline 241 may identify feature primitives, operators of feature primitives, feature primitive stacks, one or more scripts representing dimension-reducing functions, one or more scripts representing feature-scoring functions, one or more scripts representing feature selection operations, etc. For example, the pipeline 241 may be stored as a JavaScript Object Notation (JSON) file, where each nested element may represent an identifier of a stack of feature primitives or a set of dimension-reducing functions. Some embodiments may then store the pipeline 241 for later use to transform additional datasets such that the additional datasets may also be updated to include feature values of the synthesized features 233 and be dimensionally reduced using the same transformation operations used to transform the modified dataset 235 to the input dataset 204.

Figure 3:
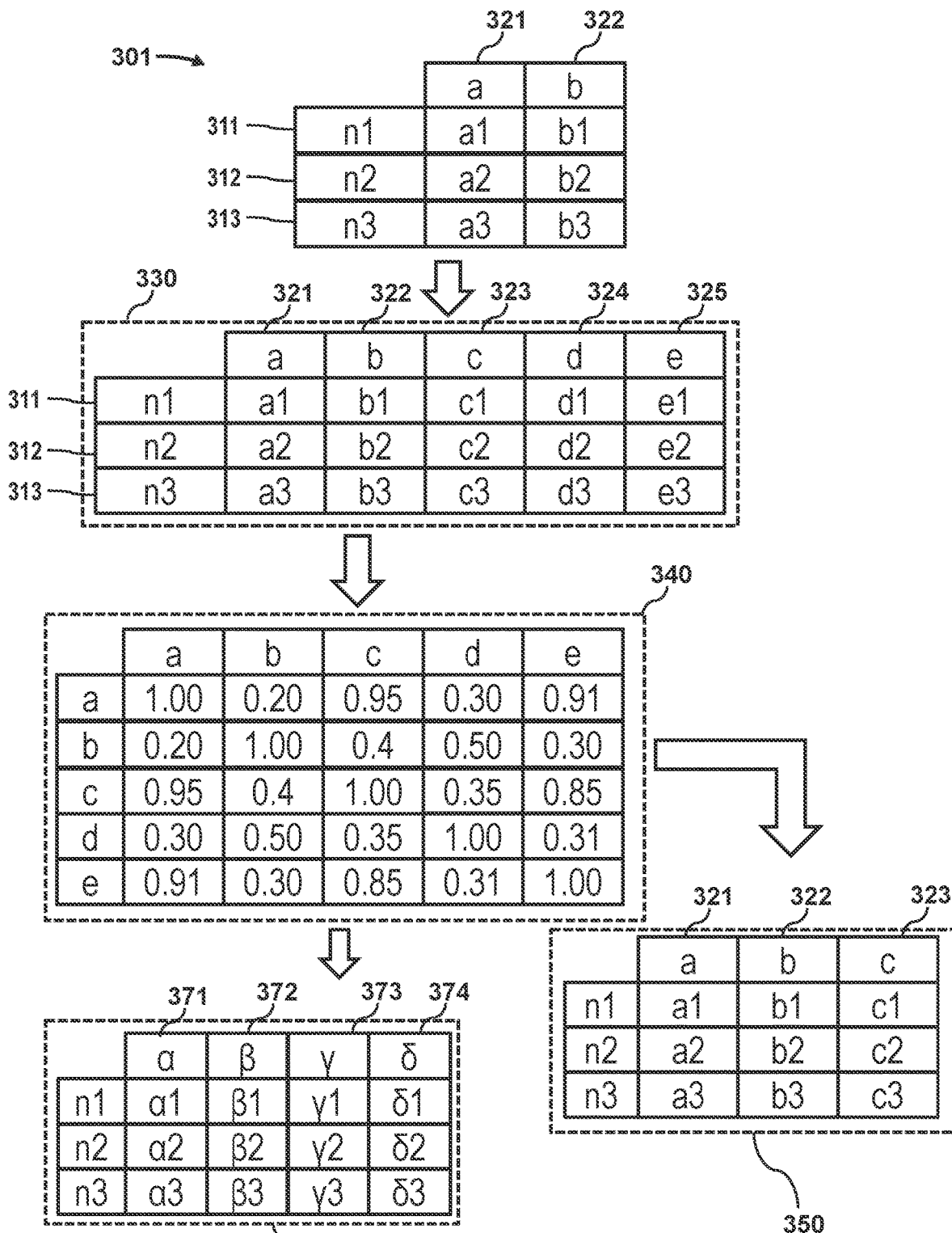
FIG. 3 shows a representation of datasets before and after implementing deep feature synthesis and dimension-reducing operations, in accordance with one or more embodiments.

FIG. 3 shows a representation of datasets before and after implementing deep feature synthesis and dimension-reducing operations, in accordance with one or more embodiments. A dataset 301 is shown with a first data object 311, second data object 312, and third data object 313, labeled "n1," "n2," and "n3," respectively. Each data object may include a feature value for a first feature 321 and a feature value for a second feature 322, labeled "a" and "b," respectively. As a part of performing a deep feature synthesis operation, some embodiments may provide the dataset 301 to a stack of feature primitives to generate a third feature 323, a fourth feature 324, and a fifth feature 325, labeled "c," "d," and "e," respectively.

Some embodiments may then determine a correlation matrix 340 to determine a correlation between different features generated during deep feature synthesis or features of the dataset 301. Some embodiments may determine that of the five features, three of the features are highly correlated, where the three correlated features include the first feature 321, the third feature 323, and the fifth feature 325. Some embodiments may determine that these three features do not satisfy a correlation threshold equal to 0.90, where a pair of features may be considered to be correlated, and does not satisfy the correlation threshold if their corresponding correlation value is greater than or equal to the correlation threshold. Based on analysis of the correlation values, some embodiments may determine that a count of correlation values satisfying the correlation threshold is equal to "3." When determining a count of correlation values satisfying the correlation threshold, some embodiments may iterate through each feature and add "1" to the count of correlation values for each uncorrelated value.

Some embodiments may use this count of correlation values satisfying the correlation threshold to perform feature selection operations based on the modified dataset 330 and filter out low-scoring features to generate the dataset 350. Alternatively, or additionally, some embodiments may use this count of correlation values when performing feature production operations based on the modified dataset 330 to generate the modified dataset 370. For example, some embodiments may use PCA operations to generate the modified dataset 370, where each of the values of the set of features 371-374 of the modified dataset 370 may be generated based on values of the modified dataset 330.

Figure 4:
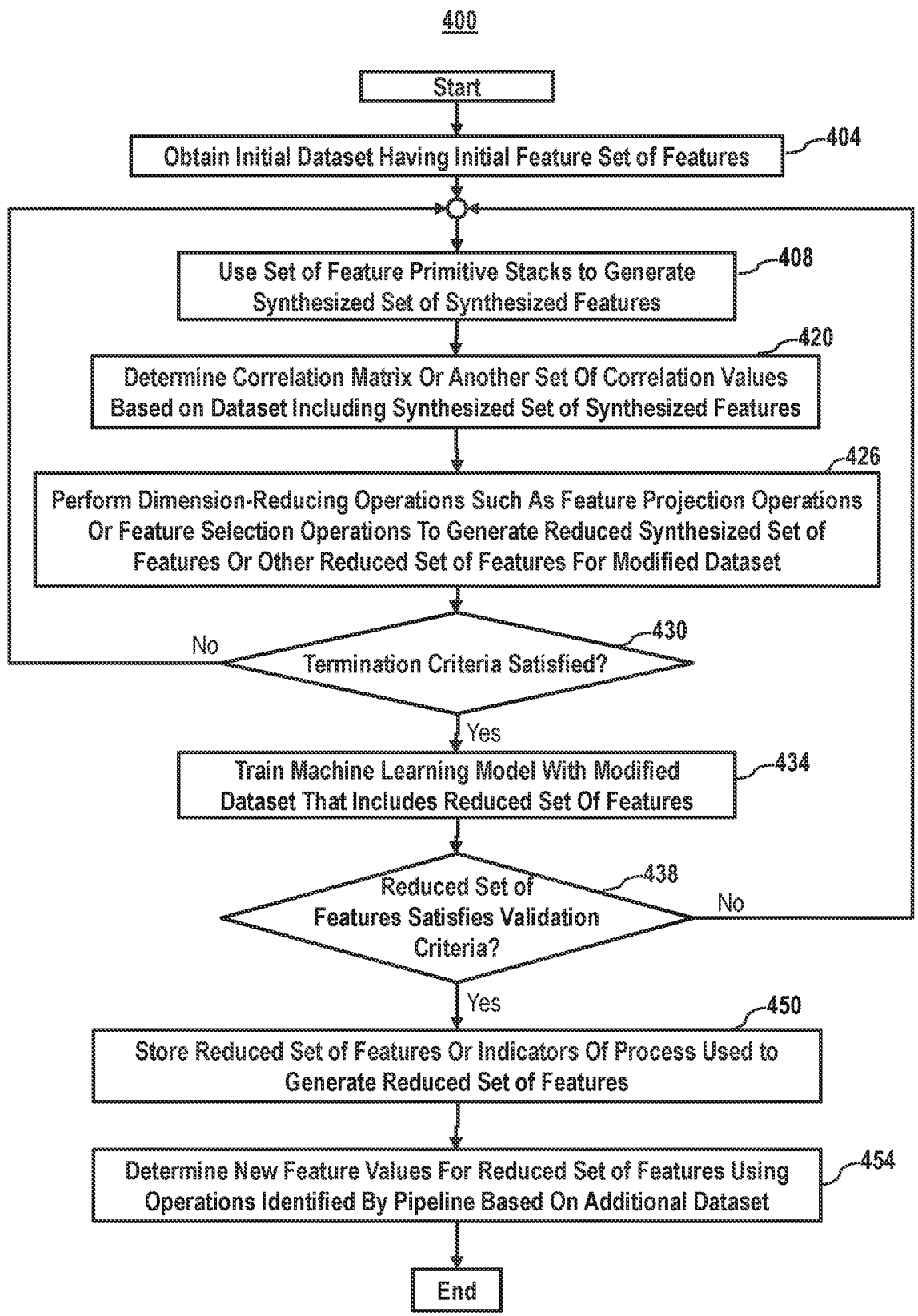
FIG. 4 shows a flowchart for updating a dataset using deep feature synthesis, in accordance with one or more embodiments.

FIG. 4 shows a flowchart for updating a dataset using deep feature synthesis, in accordance with one or more embodiments. Some embodiments may obtain a first dataset having a first feature set of features, as indicated by block 404. The first dataset may be retrieved from one of various types of data sources. Some embodiments may obtain a dataset by retrieving the dataset from a database, generating a dataset from collected data or measurements, retrieving the dataset from an application program interface (API), etc. For example, some embodiments may obtain a dataset representing database transactions of a set of users. Furthermore, the first dataset may include a first feature set of features, where the first feature set may include features having one of various types of feature values: numeric values, categorical values, binary values, string values, etc.

Some embodiments may obtain a dataset based on text input from a user, where the text input may be obtained via a chat client, e-mail responses, social media platform, an application, etc. For example, some embodiments may obtain a set of text inputs provided by users and convert each text input to a sequence of tokens. Some embodiments may then generate a set of embedding vectors for each token sequence using an encoder-decoder neural network and then generate a set of output values based on the set of embedding vectors using another machine learning model, such as another neural network. Some embodiments may then use the set of output values as the first feature values of a dataset when synthesizing features or reducing features using one or more operations of the process 400.

Some embodiments may account for missing values of a first dataset. Some embodiments may account for missing values by removing a feature from a first feature set. For example, some embodiments may determine whether each respective feature of a feature set has more than a threshold number of missing feature values, where the threshold number may be described as a missing feature threshold. Based on a determination that a count of missing feature values of a candidate feature satisfies a missing feature threshold (e.g., by exceeding the missing feature threshold), some embodiments may indicate that the candidate feature is unsuitable for one or more operations of the process 400. Some embodiments may then ignore the candidate feature when performing other operations described in this disclosure, such as a feature extraction operation.

Some embodiments may replace one or more missing feature values of a feature. For example, some embodiments may determine a measure of central tendency for a candidate feature of a first dataset, such as a mean average for the candidate feature. Some embodiments may then determine that a first data object does not include a first feature value for the candidate feature. Some embodiments may then replace the missing first feature value with the measure of central tendency. Alternatively, or in addition, some embodiments may perform a similar substitution for detected outlier feature values. After performing these substitutions, some embodiments may then synthesize feature values or dimensionally reduce features with these substitutions.

Some embodiments may perform preprocessing operations such as removing outliers from a dataset. For example, some embodiments may determine whether a feature value is outside of a pre-defined range and, in response, update the feature value. In cases of categorical data or binned data, some embodiments may perform more sophisticated operations to determine whether a feature value is an outlier. For example, some embodiments may generate a set of random decision trees. Some embodiments may determine a set of isolation numbers for a feature value of a data object based on other values of the data object and the average number of decision tree splits needed to isolate a data object using the set of random decision trees. Some embodiments may then determine that a feature value of a data object is an outlier based on a determination that the isolation number for the feature value is less than a threshold value and that the data object is an outlier data object. Some embodiments may then filter the dataset to remove the outlier data object or update the feature value itself to a different value.

Some embodiments may use a set of feature primitive stacks to generate a synthesized set of synthesized features, as indicated by block 408. A feature primitive may include any type of operator that may be combined with other operators. For example, a feature primitive may include an addition operation, a multiplication operation, or an operation that outputs the amount of time since a previous feature value for a respective feature was obtained, a mean average for a feature value, an absolute value, a trigonometric function, a cumulative sum, a logarithmic operation, etc. A feature primitive may include aggregation primitives that receive related instances as inputs and will vent output a single value. For example, a feature primitive stack may include aggregation primitives, such as an addition operator that adds the values of two different feature values for two different features. Alternatively, or additionally, a feature primitive may include transformation primitives that consider some or all of the value of an entire feature to generate a new feature. For example, a feature primitive stack may include a transformation primitive, such as an absolute value operator capable of generating an entire set of feature values for a new feature, by determining the absolute values of the feature values for a first feature.

Some embodiments may use a stack of feature primitives, where a stack of feature primitives may include a sequence of feature primitives such that using the stack of feature primitives includes performing each feature primitive of the feature primitive stack in a prescribed sequence. For example, a feature primitive stack may be represented by the text "Multiply("A", Add(4.0, NaturalLogarithm("B")))," where the corresponding sequence of feature primitives may cause some embodiments to multiply a feature value corresponding with the feature "A" with a sum of 4.0 and a natural logarithm of a feature value corresponding with the feature "B."

A synthesized feature may be represented by an identifier or a sequence of operations used to generate the feature values of the synthesized feature. As described elsewhere in this disclosure, some embodiments may perform a single iteration of deep feature synthesis and dimension-reducing operations. For example, a synthesized feature may be represented by a sequence of identifiers representing a set of feature primitive stacks and a set of dimension-reducing operators. Alternatively, a synthesized feature may be represented by a sequence of identifiers representing multiple iterations of deep feature synthesis and dimension-reducing operations (e.g., a sequence of operations representing a first set of feature primitive stacks, first set of dimension-reducing operators, a second set of feature primitive stacks, and a second set of dimension-reducing operators). A computer system may then use this sequence of identifiers to perform a corresponding sequence of operations that causes the computer system to generate an intermediate dataset with the first set of feature primitive stacks and then use the first set of dimension-reducing operators based on the intermediate to generate a first reduced dataset. The sequence of operations may then cause the computer system to generate an additional intermediate dataset and use a second set of dimension-reducing operators to generate a modified dataset. Some embodiments may continue iteratively chaining deep feature synthesis and dimension-reducing operations until a set of termination criteria is satisfied.

Some embodiments may obtain a feature primitive stack as a user-provided input. For example, some embodiments may receive a JSON file that indicates multiple sequences of operators, where each sequence of operators may represent a feature primitive stack. Alternatively, or additionally, some embodiments may obtain metadata associated with the dataset to be used for feature synthesis. Some embodiments may then determine a set of feature primitive stacks to use based on the associated set of metadata values. For example, based on a determination that a first metadata value for a dataset is set to "type abcde," some embodiments may retrieve a specific set of feature primitive values from multiple sets of feature primitive stacks. In some embodiments, a metadata value may be a value that is associated with a specific data object or set of data objects and is not a feature value of the specific data object or set of data objects. For example, the metadata may include feature names for a feature, dataset names, a set of descriptors of the dataset, a set of descriptors for one or more specific features of the dataset, a category assigned to a specific data object, etc. In some embodiments a category may be associated with a dataset if the dataset is directly labeled with the category, a feature of the dataset is labeled with the category, a data object of the dataset is labeled with the category, etc. For example, a dataset may include records having values for the feature "f1," where feature "f1" is labeled with the metadata category "c1." A system may determine that features labeled with the metadata category "c1" is associated with a target sequence of feature primitives or target set of feature primitives and retrieve the target sequence or set of feature primitives from a database or other data store. When processing a second dataset that does not include any features labeled with the metadata category "c1," the system may forego retrieving the target sequence or set of feature primitives. Some embodiments may then use the target sequence or set of feature primitives to generate one or more new features during a feature synthesis operation.

Alternatively, or additionally, some embodiments may generate a set of feature primitive stacks by a random or semi-random method based on a set of feature primitive stack parameters. For example, some embodiments may obtain a first stack generation parameter representing a total number of stacks to generate, a maximum operator depth, or a maximum number of first features to include in a feature primitive stack. Some embodiments may then generate multiple feature primitive stacks by generating permutations of feature primitive sequences, where the length of the sequence may be limited by the maximum operator depth, the number of sequences is limited to the total number of stacks to generate, or the number of features of a first dataset to use for feature synthesis is limited by the maximum number of first features. Various other types of stack generation parameters may be used when generating a feature primitive stack. For example, some embodiments may be required to use a specified feature of a first dataset when synthesizing a feature with the use of a feature primitive stack.

Some embodiments may determine what set of feature primitive stacks to use based on a predicted resource consumption or value correlated with predicted resource consumption, such as a dataset size. For example, some embodiments may obtain a dataset and determine a dataset size representing a count of feature values of the obtained dataset to use for feature synthesis or dimension-reducing operations. Some embodiments may then determine a depth and types of operations to perform based on the dataset size or a predicted resource consumption based on the dataset size. Some embodiments may form a predicted resource consumption such as a required time for computation, processor usage, memory usage, or cost based on a number of data objects, a number of features of the data objects used to synthesize or reduce features, etc., using a statistical model, a machine learning model, etc.

Alternatively, some embodiments may assign a resource consumption value to a sequence of operations that include providing a data object or set of data objects to a set of feature primitive stacks. Some embodiments may be able to access multiple datasets and select which dataset to use for feature synthesis-and-reduction operations from these multiple datasets based on the resource consumption value. For example, some embodiments may first determine a resource consumption value indicating an amount of processor time needed on a set of servers based on a specified set of feature primitive stacks. Some embodiments may then predict a first resource consumption for a first dataset and a second resource consumption for the second dataset based on the resource consumption value and select either the first or second dataset based on their associated predicted resource consumption.

As described elsewhere in this disclosure, some embodiments may use different sets of feature primitive stacks between one or more iterations of a loop. For example, some embodiments may use a first set of feature primitive stacks to perform a first set of chained operations on a first set of feature values to determine a first synthesized feature set and then generate a reduced feature set based on the first set of feature values. Some embodiments may then use a second set of feature primitive stacks to perform a second set of chained operations on feature values of the reduced feature set and the first dataset to update the reduced feature set. In some embodiments, the first and second set of feature primitive stacks may share one or more feature primitives or feature primitive stacks. Alternatively, the first and second set of feature primitive stacks may be completely different with respect to the feature primitives used or the feature primitive stacks used.

Some embodiments may reduce the computational cost of determining a set of feature values for a synthesized feature by determining whether a set of feature values had been previously provided to a feature primitive or feature primitive stack. For example, some embodiments may receive a first dataset including a first feature and a corresponding set of feature values that is to be provided to a set of feature primitive stacks. Some embodiments may determine whether the corresponding set of feature values had been previously provided to a first feature primitive stack of the set of feature primitive stacks in a previous operation and whether the results are still stored in an accessible memory. In response to a determination that the corresponding set of feature values has been provided to the first feature primitive stack, some embodiments may retrieve a stored set of feature values for the first primitive stack that is stored in the accessible memory instead of re-performing operations of the first feature primitive stack.

Some embodiments may determine a correlation matrix or another set of correlation values based on a dataset that includes the synthesized set of synthesized features, as indicated by block 420. Some embodiments may determine the correlation matrix based on the correlation between different synthesized features of a dataset. For example, some embodiments may generate a first synthesized feature and a second synthesized feature and determine a correlation between the first and second synthesized features based on their corresponding feature values.

Some embodiments may generate feature values for datasets with a significant number of data objects. In some cases, there may be a significant computational delay in determining the correlation values between two features based on all of their respective feature values. Some embodiments may perform operations to restrict the number a feature values used to compute a correlation value to a limit. For example, some embodiments may determine the correlation value between two features based on each of their most recently-collected 1000 data points. Alternatively, or additionally, some embodiments may restrict the number of feature values used to determine correlation to the feature values corresponding with a time after a time threshold. For example, some embodiments may restrict the feature values used for correlation analysis to the feature values corresponding with data collected within the last month. A synthesized feature value may correlate with a timepoint if the synthesized feature value is derived from a first feature collected or otherwise associated with that timepoint. In some embodiments, a synthesized feature may be associated with the earliest timepoint of a set of timepoints of the feature values used to determine the synthesized feature value. Alternatively, or additionally, a synthesized feature value may be associated with a latest timepoint of a set of time points of the feature values used to determine the synthesized feature.

Some embodiments may analyze a correlation matrix or other set of correlation values to determine a count of correlation values that satisfy a correlation threshold. In some embodiments the correlation threshold may represent a threshold above which a pair of features will be considered to be "correlated." Some embodiments may count the number of uncorrelated features based on this correlation threshold. For example, some embodiments may iteratively loop through each synthesized feature of a synthesized set of synthesized features to determine whether the synthesized feature has a correlation with any other synthesized feature. In response to a determination that the synthesized feature does not have a correlation value with any other synthesized feature greater than the correlation threshold, some embodiments may add one to a count of features that satisfy the correlation threshold. Some embodiments may account for repetitive features and skip one or more correlated features when determining the count of features that satisfy the correlation threshold. For example, based on a determination that a first and second feature are uncorrelated and a first and third feature are uncorrelated, some embodiments may add one to the count of features satisfying correlation threshold. Based on a determination that a second and third feature are correlated by having a corresponding correlation value that is greater than a correlation threshold, some embodiments may skip increasing the count of correlation values that satisfy the correlation threshold by one.

Some embodiments may perform dimension-reducing operations such as future selection operations or feature extraction operations to generate a reduced synthesized set of features or another reduced set of features for a modified dataset, as indicated by block 426. Dimension-reducing operations may include feature selection operation, where a feature selection operation may filter a set of features and select a subset of the set of features for further use. For example, after synthesizing a set of synthesized features having five synthesized features, some embodiments may select three of the five synthesized features for further operations described in this disclosure, such as feature extraction operations or training operations. After performing a set of feature extraction operations on an input dataset to generate a modified dataset, a feature count of the modified dataset may be less than the input dataset. For example, after using a PCA operator or another feature extraction operator to dimensionally reduce a synthesized feature set having a feature count equal to 20, a feature count of the resulting reduced feature set may be equal to a value less than 20, such as 19, 15, 11, or some other value less than 20. Some embodiments may treat the feature values of the synthesized features as an intermediate set of feature values by using the feature values of the synthesized features as inputs for a dimension-reducing operation.

Some embodiments may perform feature selection operations by first assigning a set of fitness scores to an initial synthesized feature set. In some embodiments, only the synthesized features of a dataset are reduced using a feature selection operation. For example, some embodiments may generate an initial synthesized feature set that includes a first synthesized feature "alpha," a second synthesized feature "beta," and a third synthesized feature "gamma," based on an initial dataset that includes a first initial feature "A" and a second initial feature "B." Some embodiments may then perform a correlation analysis using one or more operations described by block 420 to obtain "2" as a value for the count of correlation values that satisfies a correlation threshold. Some embodiments may then reduce only the number of synthesized features to "2" based on their associated fitness scores. For example, if a first fitness score for the first synthesized feature is equal to 85, a second fitness score for the second synthesized feature is equal to 20, and a third fitness score for the third synthesized feature is equal to 70, some embodiments may sort the fitness scores to determine that the first and third synthesized features may be kept during a feature selection operation.

Various types of fitness scores may be used for feature selection operations, where the fitness score for a feature may be based on a predictive potential for a feature. For example, some embodiments may apply a function that determines whether the value of a synthesized feature is a good statistical indicator of a class, where a correlation between the class and the value of the feature that satisfies a fitness threshold indicates that the synthesized feature has a high fitness score. Some embodiments may determine correlations between feature values of the feature for a set of data objects and classes assigned to the set of data objects using a set of applications. Some embodiments may use simulations or machine learning operations to assign fitness scores to features. For example, some embodiments may apply a one-hot encoding to each class of a dataset and then use a random forest model or another learning model to determine the fitness score of each feature for predicting the importance of a value. Some embodiments may use other feature selection operations, such as forward feature selection operations or backward features selection operations to select features.

Alternatively, or additionally, other types of fitness scores may be used. Some embodiments may determine a fitness score for a feature based on statistical metrics of the feature, such as determining a fitness score based on a variance of the feature, a mean value of the feature, a range of the feature, etc. For example, some embodiments may determine a variance of a feature and assign a fitness score equal to or based on the variance of the feature. Some embodiments may normalize one or more metrics of the feature. Furthermore, some embodiments may determine a fitness score based on multiple weighted factors. For example, some embodiments may determine a fitness score for a feature as a weighted sum of a variance of the feature and a predictive potential of the feature derived from a quantified relationship between values of the feature classes assigned to data objects.

Furthermore, some embodiments may perform feature selection operations on only the synthesized features of a dataset. Alternatively, some embodiments may perform feature selection operations on non-synthesized features of a dataset. For example, some embodiments may determine that a set of features including both synthesized features and un-synthesized features of a modified dataset is to be reduced to ten features. In response, some embodiments may assign fitness scores to each feature of an aggregated dataset combining both types of features and select a combination of synthesized features and non-synthesized features based on their respective fitness scores.

A set of dimension-reducing operations may include performing a set of feature extraction operations by using a set of feature extraction operators. A feature extraction operator may be implemented as a function, method, application, or another set of program instructions that performs feature extraction operations. For example, a feature extraction operator may include a function that performs PCA. When performing a feature extraction operation, some embodiments may reduce both non-synthesized features and synthesized features of a same dataset using a feature extraction operator. For example, some embodiments may synthesize 10 synthesized features based on a dataset that includes a first set of features having five first features. Some embodiments may then use a feature extraction operator to reduce all 15 features to a reduced set of features having seven features and their corresponding reduced set of feature values based on a count of correlation values equaling seven, where the correlation values may be determined based on a correlation matrix providing correlation matrix for all 15 features.

A feature extraction operation may include one or more various types of feature extraction operations. For example, a feature extraction operation may include a factor-based operation such as a PCA operation, independent component analysis (ICA) operation, etc. Some embodiments may determine the extent of a dimension-reducing operation based on a dimension parameter, where the dimension parameter may be based on a count of correlation values that satisfy a threshold. For example, a factor-based operation may include performing a PCA operation by determining a covariance matrix or other set of covariance values of a feature set to be reduced, where each covariance value may be a measure of covariance between pairs of features of the feature set. As described elsewhere, some embodiments may apply PCA to reduce a feature set that includes both synthesized and non-synthesized features. Thus, one or more covariance values of the feature set may be or otherwise be based on a measure of covariance between a synthesized feature and a non-synthesized feature. Some embodiments may then determine a set of eigenvectors of the covariance matrix and determine a feature vector based on the set of eigenvectors. For example, some embodiments may determine a feature vector as an associated set of eigenvalues corresponding with the set of eigenvectors. Some embodiments may then dimensionally reduce a set of features by dimensionally reducing the dataset of the set of features based on the set of eigenvectors and the feature vector.

In some embodiments, a factor-based operation may include a set of linear operations, such as a set of PCA operations that does not include linear operations. Alternatively, some embodiments may perform a set of non-linear operations to dimensionally reduce a dataset, where a non-linear operation may include using one or more non-linear operators. For example, some embodiments may determine a kernel matrix based on a set of feature values using a kernel function, such as a Polynomial function, a Gaussian function, or some other non-linear function. Some embodiments may then center the kernel matrix and determine an associated set of eigenvectors and eigenvalues. Some embodiments may then select a subset of the eigenvalues and eigenvectors and use the selected subset to determine a reduced feature set. Furthermore, some embodiments may extract a feature using a neural network as a dimension-reducing operator. For example, some embodiments may train an autoencoder neural network and then use the trained autoencoder neural network to reduce a synthesized feature set to a reduced synthesized feature set.

Some embodiments may use a correlation matrix or other set of correlation values to determine one or more parameters of a dimension-reducing operation. For example, some embodiments may determine a count of features that satisfy a correlation threshold based on a correlation matrix and then use this count of features to select during a feature selection operation. Alternatively, or additionally, some embodiments may perform feature extraction operations to reduce a number of features based on the count of correlation values that satisfy the correlation threshold. For example, some embodiments may perform feature extraction operations on a dataset that includes five synthesized features and use a PCA operation to dimensionally reduce the five synthesized features into three synthesized features.

While some embodiments are described in this disclosure as performing dimension-reducing operations based on a set of correlation values, some embodiments may perform dimension-reducing operations independently of any correlation values. For example, some embodiments may apply feature selection operations or feature extraction operations based on a preset value, a user-provided value, etc.

Some embodiments may perform feature selection in conjunction with feature extraction operations. For example, some embodiments may select a pre-determined number of features of a set of synthesized features based on fitness scores assigned to the synthesized features. As described elsewhere, some embodiments may determine how many synthesized features to select based on a count of correlation values that satisfy a correlation threshold. Some embodiments may then dimensionally reduce the selected set of synthesized features or a dataset that includes the selected set of synthesized features. For example, if a count of correlation values satisfying a threshold is equal to five, some embodiments may first select five features based on their corresponding fitness scores and then combine the selected features with a first dataset and dimensionally reduce the combined dataset to having five features. Alternatively, some embodiments may select a number of features that is greater than a correlation count and then perform feature extraction to reduce the number of features to the correlation count. For example, if a count of correlation values satisfying a threshold is equal to 10, some embodiments may select 25 synthesized features of a set of synthesized features and then perform feature extraction operations to dimensionally reduce the 25 synthesized features into 10 dimensionally reduced synthesized features. Alternatively, or additionally, some embodiments may determine an aggregated collection of features that include the 25 synthesized features and non-synthesized features of a first dataset to dimensionally reduce the aggregated collection of features.

Some embodiments may perform operations to determine whether a set of termination criteria is satisfied, as indicated by block 430. Some embodiments may perform multiple sets of feature synthesis and dimension-reducing operations until the set of termination criteria is satisfied. For example, some embodiments may receive a user-provided input representing an iteration limit and perform that number of deep feature synthesis and dimension-reducing operations until the iteration limit is satisfied by a corresponding iteration count. Once the iteration count satisfies the iteration limit, such as being greater than or equal to the iteration limit, some embodiments may then stop the set of iterations. For example, if a user-provided value is equal to 20, some embodiments may stop further operations to synthesize features or reduce a feature set once an iteration count is equal to 20, where the iteration count is a count of the number of times that such feature was synthesized and then reduced.

Some embodiments may ensure that, for each respective iteration of a set of iterations used to loop through operations described by blocks 408, 420, 426, or 430, feature synthesis operation depends on one or more values of a first dataset. For example, during a second iteration of a deep feature synthesis operation after a determination of a set of termination criteria, some embodiments may provide the output features and feature values of a previous iteration to a set of feature primitive stacks to generate a new set of synthesized features. The set of feature primitive stacks used for one iteration may be the same or may be different from a previous iteration. For example, some embodiments may use a first set of features during a first iteration to generate a first set of synthesized features and obtain a different set of feature primitive stacks to synthesize a new set of features during a second iteration.

Similarly, some embodiments may be configured to use at least one feature value of the first dataset used to generate a first set of synthesized features for each dimension-reducing operation of a set of dimension-reducing operations performed in the process 400. For example, some embodiments may be configured to perform feature extraction operations on a dataset that includes a first dataset and a plurality of synthesized features and their corresponding feature values. Each resulting set of reduced-dimension features may be used as inputs in conjunction with the feature values of the first dataset when generating a subsequent synthesized set of features, for example, after a first iteration of operations that include performing a deep feature synthesis operation to generate a first set of synthesized features and performing a PCA operation to generate a first reduced feature set. Some embodiments may then use a second set of feature primitive stacks that use the first reduced feature set and their corresponding feature values in conjunction with feature values of the first dataset to generate a second set of synthesized features. Some embodiments may then dimensionally reduce a dataset that includes the first dataset, the first set of synthesized features, and the second set of synthesized features to generate a second reduced feature set. Alternatively, after using the first set of synthesized features to synthesize a second set of synthesized features, some embodiments may discard or otherwise ignore the first set of synthesized features. Instead, some embodiments may perform dimension-reducing operations on only the second set of synthesized features or dimension-reducing operations on a dataset that includes both the second set of synthesized features and the first dataset.

After performing a set of dimension-reducing operations on a dataset having synthesized features, some embodiments may generate a modified dataset that includes both features of a first dataset described by block 404 and one or more synthesized features. In some embodiments, each iteration may produce a different feature such that a modified dataset produced after a second iteration of synthesis-and-reduction operations may include an additional synthesized feature that is not included in a modified dataset produced by a first iteration of synthesis-and-reduction operations.

While some embodiments are described as performing multiple iterations until a set of criteria is satisfied, some embodiments may forego checking if a set of criteria is satisfied. For example, some embodiments may perform a first operation to use deep feature synthesis to generate features and a second operation to dimensionally reduce a dataset that includes the generated features. Some embodiments may then proceed to performing other operations described in this disclosure without determining whether a set of termination criteria is satisfied. For example, after dimensionally reducing a set of features, some embodiments may proceed to operations described by blocks 434, 438, or 450.

Some embodiments may train a machine learning model with a modified dataset that includes the reduced set of features, as indicated by block 434. Some embodiments may train a machine learning model that includes a neural network model, a random forest model, or some other type of learning model. The set of inputs to the machine learning model may include feature values of a first dataset and a reduced set of feature values of a reduced set of features. For example, some embodiments may synthesize a set of synthesized features based on feature values of a first dataset. Some embodiments may then reduce the set of synthesized features to form a reduced feature set and a corresponding reduced set of feature values and form a modified dataset that includes the first dataset and the reduced set of feature values. Some embodiments may then provide the modified dataset and any classes associated with the data objects of the modified dataset to a transformer neural network to train the transformer neural network to provide predicted classes. Alternatively, or additionally, some embodiments may train a machine learning model based only on the reduced set of features. For example, some embodiments may synthesize a set of synthesized features based on a first dataset and then train a machine learning model based on the set of synthesized features and their associated values without using feature values of the first dataset.

Some embodiments may determine whether the reduced set of features satisfies a set of validation criteria, as indicated by block 438. Some embodiments may determine that a reduced synthesized set satisfies a set of validation criteria based on a machine learning model trained with the reduced synthesized set. Some embodiments may compare the performance of a trained machine learning model with a different trained machine learning model, where the different trained machine learning model has been trained on a first dataset. For example, some embodiments may train a first machine learning model based on a first dataset and then generate a modified dataset using operations described in the process 400, such as operations described by blocks 408, 420, 426, or 430. Some embodiments may then train a second machine learning model based on the modified dataset and determine an accuracy score for both the first and second machine learning models based on a validation dataset. Based on a determination that the trained second machine learning model is more accurate than the trained first machine learning model, some embodiments may determine that the trained second machine learning model satisfies a set of validation criteria. Furthermore, some embodiments may use other learning model outputs of machine learning models when determining whether a set of criteria is satisfied. For example, some embodiments may determine learning model outputs, such as the accuracy of a machine learning model, when predicting a specific class based on a validation dataset.

As described elsewhere in this disclosure, some embodiments may generate a reduced set of features based on feature values of a first dataset instead of feature values of a synthesized feature set. For example, some embodiments may have trained a first machine learning model based on a first dataset. Some embodiments may then have synthesized a feature set based on a first dataset, determine a count of correlation values that satisfy a correlation threshold based on the synthesized feature set, and dimensionally reduce the first dataset based on the count of correlation values to determine a reduced feature set. Some embodiments may then train a second machine learning model based on the dataset of the reduced feature set. Some embodiments may then determine whether the second machine learning model has an accuracy score that satisfies an accuracy threshold after determining the accuracy score based on a validation dataset. Some embodiments may determine the accuracy threshold as being equal to or otherwise based on an accuracy score of the first machine learning model. Some embodiments may determine that the reduced set of features satisfies the set of validation criteria based on a determination that the second machine learning model satisfies the accuracy threshold, such as by having a greater accuracy than the accuracy threshold.

In response to a determination that the reduced synthesized set satisfies a set of validation criteria, some embodiments may proceed to operations described by block 450. Otherwise, operations of the process 400 may proceed to operations described by block 404 or block 408, where some embodiments may wait to obtain a new set of first data or use a different set of feature primitive stacks.

Some embodiments may store the reduced set of features or indicators of the process used to generate the reduced set of features, as described by block 450. A reduced set of features may be stored in association with a first feature set of a dataset used to generate the reduced set of features. For example, some embodiments may store a reduced synthesized set in a database, where the database may indicate at least one association between the reduced synthesized set and a first feature set of the dataset used to generate the reduced synthesized set.

Some embodiments may store a set of identifiers of the operations used to generate a reduced set of features. For example, some embodiments may store a set of operations in the form of a pipeline used to generate a reduced set of features based on a first dataset or its associated first set of features. The pipeline may be represented as a set of identifiers encoded in a script, text file, application, list of names or parameters, etc. For example, some embodiments may store a pipeline as a JSON file, where different nested values may represent feature primitive stacks to be used as described by block 408, may represent a correlation threshold as used for operations described by block 420, dimension-reducing operations described by block 426, or other operations described in this disclosure. Some embodiments may export a set of identifiers representing a pipeline used to generate the reduced set of features or some other representation of one or more operations of the process 400 to permit the efficient generation of the same set of features for a different dataset.

Some embodiments may determine new feature values for a reduced set of features using operations identified by a pipeline based on an additional dataset, as indicated by block 454. Some embodiments may receive an additional dataset that includes features of the first dataset described in block 404. After receiving the additional dataset, some embodiments may determine whether the additional dataset includes the same set of first features used to generate the synthesized set of synthesized features. In response to a determination that the additional dataset includes the same set of first features used to generate the synthesized set of synthesized features, some embodiments may compute new feature values corresponding with the synthesized set of synthesized features or some other reduced set of features using the pipeline described by block 454. Alternatively, in response to a determination that the additional dataset includes the same set of first features, some embodiments may display a visual indicator of the pipeline or otherwise display a prompt indicating the reduced set of features.

Some embodiments may perform another machine learning model training operation based on an additional dataset or the new feature values of the reduced set of features to train an additional machine learning model. Some embodiments may compare a machine learning model trained with a first reduced dataset with an additional machine learning model trained with a second reduced dataset, where the second reduced dataset may be determined based on the additional dataset. For example, some embodiments may then compare the accuracy of the machine learning models by providing the first and second trained models with a validation dataset. In some bases, a user may expect that the two accuracy values would be similar. In cases where a difference value between the two accuracy values satisfies an alert threshold (e.g., by being greater than the alert threshold), some embodiments may associate an alert indication with the additional dataset or the initial dataset. The alert indication may indicate an anomaly or that at least one of the datasets should be reviewed for data drift.

The operations of each method presented in this disclosure are intended to be illustrative and non-limiting. It is contemplated that the operations or descriptions of FIG. 4 may be used with any other embodiment of this disclosure. In addition, the operations and descriptions described in relation to FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-128 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems may provide more or less functionality than is described. For example, one or more of subsystems 124-128 may be eliminated, and some or all of its functionality may be provided by other ones of subsystems 124-128. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X' ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Enumerated Embodiments

The present techniques will be better understood with reference to the following enumerated embodiments:

1. A method comprising: obtaining a first dataset comprising a first set of features; generating a second set of features based on the first set of features by providing the first dataset to feature primitive stacks that respectively corresponds to features of the second set of features; determining a reduced feature set based on the second set of features and a count of correlation values between features of the second set of features; and storing the reduced feature set in a database in association with the first set of features based on a determination that a second dataset comprising the reduced feature set satisfies a set of criteria.
2. The method of embodiment 1, wherein the correlation values satisfy a correlation threshold.
3. A method comprising: obtaining a first dataset comprising a first feature set of features; generating a synthesized set of synthesized features from the first feature set by providing the first dataset to feature primitive stacks that respectively corresponds to synthesized features of the synthesized set, wherein a feature primitive stack outputs a synthesized feature value for the synthesized feature corresponding to the feature primitive stack based on feature values of the first feature set; extracting a reduced synthesized set from the synthesized set based on a count of correlation values between features of the synthesized set, wherein the correlation values satisfy a user-defined correlation threshold, and wherein each correlation value of the correlation values indicates a correlation between a respective pair of features of the synthesized set; generating a modified dataset from the first dataset based on the reduced synthesized set, wherein the modified dataset comprises at least one feature of the first feature set and at least one feature of the reduced synthesized set; in response to validating the reduced synthesized set, storing the reduced synthesized set in a database in association with the first feature set, wherein validating the reduced synthesized set comprises determining that a second machine learning model trained on the modified dataset has greater accuracy than a first machine learning model trained on the first dataset.
4. A method comprising: obtaining a first dataset comprising a first set of features; generating a second set of features based on the first set of features set by providing the first dataset to feature primitive stacks that respectively corresponds to features of the second set of features; determining a reduced feature set based on the second set of features and a count of correlation values between features of the second set of features, wherein the correlation values satisfy a user-defined correlation threshold; generating a second dataset based on the first dataset and the reduced feature set; and in response to validating the reduced feature set, storing the reduced feature set in a database in association with the first set of features, wherein validating the reduced feature set comprises determining that a second machine learning model trained on the second dataset produces a learning model output that satisfies a set of criteria.
5. The method of any of embodiments 1 to 4, wherein the synthesized set comprises a first synthesized feature, a second synthesized feature, and a third synthesized feature, the method further comprising: in response to a determination that a first correlation value between the first synthesized feature and the second synthesized feature satisfies the user-defined correlation threshold, increasing the count of the correlation values by one.
6. The method of embodiment 5, wherein the method comprise not increasing the count of the correlation values by one in response to a determination that a second correlation value between the second synthesized feature and the third synthesized feature satisfies the user-defined correlation threshold.
7. The method of any of embodiments 1 to, wherein the feature primitive stacks are first feature primitive stacks, the method further comprising: determining initial feature primitive stacks; generating a first synthesized feature set using the initial feature primitive stacks; determining a set of fitness scores based on classes of the dataset by determining a fitness score for each feature of the initial synthesized feature set; and determining the first feature primitive stacks based on the set of fitness scores.
8. The method of any of embodiments 1 to 7, wherein generating the second set of features comprises: determining a measure of central tendency for a first feature of the first dataset, wherein the first dataset comprises a first data object; determining that a first feature value for the first feature of the first data object is empty; updating the first feature value based on the measure of central tendency; and generating a second feature value of the second set of features for the first data object based on the updated first feature value.
9. The method of any of embodiments 1 to 8, wherein generating the second set of features comprises: determining that a feature value of a data object is empty, wherein the first dataset comprises the data object; updating the feature value with a feature value prediction based on other feature values of the data object; and generating a synthesized feature for the data object based on the feature value prediction.
10. The method of any of embodiments 1 to 9, and wherein the correlation values is a first set of correlation values, and wherein determining the reduced feature set comprises: reducing the second set of features to generate a reduced second set of features based on the count of correlation values; determining a second set of correlation values based on an aggregated collection of features comprising the first set of features and the second set of features; and reducing the aggregated collection of features to generate the reduced feature set based on the first set of features, wherein the reduced feature set comprises at least one feature of the first set of features and at least one feature of the reduced second set of features.

11. The method of any of embodiments 1 to 10, further comprising: obtaining a category associated with the first dataset; and retrieving the feature primitive stacks based on the category.

12. The method of any of embodiments 1 to 11, wherein determining the reduced feature set comprises: determining a set of covariance values, wherein the set of covariance values comprises a measure of covariance between pairs of features of the second set of features; determining a set of eigenvectors and an associated set of eigenvalues based on the set of covariance values; and determining a feature vector based on the set of eigenvectors and the associated set of eigenvalues, wherein determining the reduced set of features comprises determining the reduced set of features based on the feature vector and the count of correlation values.

13. The method of embodiment 12, wherein the set of covariance values comprises a measure of covariance between a feature of the second set of features and a feature of the first set of features.

14. The method of any of embodiments 1 to 13, wherein determining the reduced feature set comprises: determining an aggregated collection of features comprising the first set of features and the second set of features; and reducing the aggregated collection of features to generate the reduced feature set based on the first set of features based on the count of the correlation values, wherein the reduced feature set comprises at least one feature of the first set of features, and wherein the reduced feature set does not comprise any features of the second set of features.

15. The method of any of embodiments 1 to 14, the method further comprising: obtaining a sequence of tokens; generating a plurality of embedding vectors based on the sequence of tokens using a first neural network; determining a set of feature values for a data object representing the sequence of tokens by providing the plurality of embedding vectors to a second neural network, wherein generating the second set of features comprises determining a synthesized feature value of the second set of features based on the set of feature values.

16. The method of any of embodiments 1 to 15, wherein determining the reduced feature set comprises: determining a plurality of fitness scores associated with the second set of features; selecting a first subset of the second set of features based on the plurality of fitness scores wherein the first subset does not include a non-selected feature of the second set of features; and reducing the first subset of the second set of features using a feature extraction operation to determine the reduced feature set.

17. The method of embodiment 16, wherein using the feature extraction operation comprises determining a dimension parameter of the feature extraction operation based on the count of the correlation values.

18. The method of any of embodiments 1 to 17, wherein determining the reduced feature set comprises providing feature values of the reduced feature set to an autoencoder neural network.

19. The method of any of embodiments 1 to 18, the method further comprising indicating a candidate feature of the first dataset based on a determination that a count of feature values of the candidate feature that are empty does not satisfy a missing feature threshold, wherein generating the second set of features comprises generating the second set of features without using feature values of the candidate feature.

20. The method of any of embodiments 1 to 19, wherein reducing the feature set comprises using a set of dimension-reducing operators to determine the reduced feature set based on the second set of features, the method further comprising storing a set of identifiers representing the feature primitive stacks and the set of dimension-reducing operators.

21. The method of embodiment 20, the method further comprising: obtaining a third dataset; determining whether the third dataset comprises the first set of features; and in response to a determination that the third dataset comprises the first set of features, retrieving the set of identifiers.

22. A method comprising: obtaining a first dataset comprising a first feature set; generating a second dataset by providing the first dataset to a set of feature primitive stacks; generating a modified dataset based on the second dataset by dimensionally reducing the modified dataset such that the modified dataset comprises a feature not present in the first dataset; generating an additional dataset by providing the modified dataset to the set of feature primitive stacks; and updating the modified dataset based on the additional dataset by dimensionally reducing the modified dataset; and storing synthesized features of the modified dataset in a database in association with the first feature set.

23. A method of embodiment 22, wherein the second dataset comprises at least one feature not present in the first dataset.

24. A method of any of embodiments 22 to 23, wherein the modified dataset comprises at least one feature of the first dataset.

25. A method comprising: obtaining a first dataset comprising a first feature set; generating a first set of feature values by providing the first dataset to a set of feature primitive stacks; determining a reduced set of feature values based on the first set of feature values by dimensionally reducing features of the first set of feature values; generating an intermediate set of feature values by providing a value of the first dataset and a value of the reduced set of feature values to at least one feature primitive of the set of feature primitive stacks; updating the reduced set of feature values by dimensionally reducing features of the intermediate set of feature values; and storing a second dataset comprising features of the intermediate set of feature values in association with the first feature set.

26. A method comprising: obtaining a first dataset comprising a first feature set of features; generating a modified dataset from the initial dataset by: generating an intermediate dataset by providing the initial dataset to a set of feature primitive stacks, wherein the intermediate dataset comprises at least one synthesized feature not present in the initial dataset; generating the modified dataset from the intermediate dataset using a feature extraction operator such that the modified dataset comprises (i) the first feature set and (ii) at least one synthesized feature not present in the initial dataset, wherein a feature count of the modified dataset is less than a feature count of the intermediate dataset; and iteratively updating the modified dataset by, for each respective iteration of a set of iterations: generating an additional intermediate dataset by providing the modified dataset to the set of feature primitive stacks, wherein a feature count of the additional intermediate dataset is greater than a feature count of the modified dataset provided to the set of feature primitive stacks during the respective iteration; and updating the modified dataset based on the additional intermediate dataset using the feature extraction operator such that the modified dataset comprises (i) the first feature set and (ii) at least one additional synthesized feature not present in the modified dataset provided to the set of feature primitive stacks during the respective iteration, wherein a feature count of the modified dataset after the updating during the respective iteration is less than a feature count of the additional intermediate dataset; and after the set of iterations, storing synthesized features of the modified dataset in a database in association with the first feature set.

27. The method of any of embodiments 22 to 26, the method further comprising: determining a set of correlation values, wherein each respective correlation value of the set of correlation values indicates a correlation between pairs of synthesized features of the intermediate dataset; and updating the intermediate dataset by removing a subset of features associated with a subset of correlation values of the set of correlation values, wherein the subset of correlation values does not satisfy a correlation threshold.

28. The method of any of embodiments 22 to 27, the method further comprising: obtaining a set of feature primitives; and generating the set of feature primitive stacks by generating sequences of operators based on the set of feature primitives.

29. The method of any of embodiments 22 to 28, wherein iteratively updating the modified dataset comprises updating an iteration count for each respective iteration, the method further comprising: obtaining an iteration limit via a user-provided input; and in response to a determination that the iteration count satisfies the iteration limit, stopping the set of iterations.

30. The method of any of embodiments 22 to 29, further comprising updating the first dataset to remove an outlier of the first dataset by: generating a set of random decision trees; determining a set of isolation numbers for an outlier data object of the first dataset based on the set of random decision trees; and filtering the first dataset to remove the outlier data object from the first dataset.

31. The method of any of embodiments 22 to 30, wherein generating the modified dataset comprises: obtaining a user-provided feature reduction parameter; and dimensionally reducing the modified dataset based on the user-provided feature reduction parameter.

32. The method of any of embodiments 22 to 31, wherein dimensionally reducing the modified dataset comprises performing a set of linear operations based on the additional dataset.

33. The method of any of embodiments 22 to 32, wherein dimensionally reducing the modified dataset comprises: performing a set of non-linear operations based on a kernel function to determine a kernel matrix; and determining a set of eigenvectors and eigenvalues based on the kernel matrix; and selecting a subset of eigenvectors and eigenvalues based on the set of eigenvectors and eigenvalues; and determining the modified dataset based on the subset of eigenvectors and eigenvalues.

34. The method of any of embodiments 22 to 33, wherein generating the additional dataset comprises providing the modified dataset to the set of feature primitive stacks, and wherein the modified dataset comprises the at least one feature of the first dataset.

35. The method of any of embodiments 22 to 34, further comprising: receiving a third dataset; determining whether the third dataset comprises the first feature set; and in response to a determination that the third dataset comprises the first feature set, retrieving the set of synthesized features.

36. The method of any of embodiments 22 to 35, wherein the set of feature primitive stacks is a first set of feature primitive stacks, the method further comprising: storing a first set of identifiers in a sequence of identifiers, wherein the first set of identifiers identify the first set of feature primitive stacks; storing a second set of identifiers in the sequence of identifiers, wherein the second set of identifiers identify a first set of dimension-reducing operators used to determine the reduced set of features; storing a third set of identifiers in the sequence of identifiers, wherein the third set of identifiers identify a second set of feature primitive stacks used to generate the intermediate set of feature values; storing a fourth set of identifiers in the sequence of identifiers, wherein the fourth set of identifiers identify a second set of dimension-reducing operators used to dimensionally reduce features of the intermediate set of feature values; and storing the sequence of identifiers in association with the first feature set.

37. The method of any of embodiments 22 to 36, the method further comprising: receiving a third dataset; determining whether the third dataset comprises the first feature set; and in response to a determination that the third dataset comprises the first feature set, retrieving the sequence of identifiers; and generating a fourth dataset comprising the first feature set based on the sequence of identifiers.

38. The method of any of embodiments 22 to 37, the method further comprising: training a first machine learning model based on the second dataset; determining a first output by providing the first machine learning model with a validation dataset; training a second machine learning model based on the fourth dataset; determining a second output by providing the second machine learning model with the validation dataset; determining a difference value based on the first output and the second output; and in response to a determination that the difference value satisfies an alert threshold, associating an alert indication with the third dataset.

39. The method of any of embodiments 22 to 38, wherein providing the first dataset to the set of feature primitive stacks comprises: determining whether a first feature of the first feature set was previously provided to a first feature primitive of the set of feature primitive stacks; and in response to a determination that the first feature of the first feature set was previously provided to the first feature primitive, retrieving a stored set of feature values associated with the first feature primitive, wherein the first set of feature values comprises the stored set of feature values.

40. The method of any of embodiments 22 to 39, wherein: the value of the first dataset is a first value of the first dataset; the value of the reduced set of feature values is a first value of the reduced set of feature values; the set of feature primitive stacks does not comprise a second feature primitive stack; and generating the intermediate set of feature values comprises providing a second value of the first dataset and a second value of the reduced set of feature values to the second feature primitive stack.

41. The method of any of embodiments 22 to 40, wherein dimensionally reducing features of the first set of feature values comprises: selecting a subset of the first feature set; and extracting the reduced set of feature values based on the subset of the first feature set.

42. The method of any of embodiments 22 to 41, the method further comprising: determining a dataset size of the first dataset; determining a predicted resource consumption based on the dataset size; and determining the set of feature primitive stacks based on the predicted resource consumption.

43. The method of any of embodiments 22 to 42, the method further comprising: obtaining the set of feature primitive stacks via a user input; determining a resource consumption value based on the set of feature primitive stacks; and selecting the first dataset of a plurality of datasets based on the resource consumption value.

44. One or more tangible, non-transitory, machine-readable media storing instructions that, when executed by a set of processors, cause the set of processors to effectuate operations comprising those of any of embodiments 1-43.

45. A system comprising: a set of processors and memory storing computer program instructions that, when executed by the set of processors, cause the set of processors to effectuate operations comprising those of any of embodiments 1-43.

What is claimed is:

1. A system for reducing a dimensionality of a dataset generated via feature primitive stacks, the system comprising a computer system that comprises one or more processors programmed with computer program instructions that, when executed, cause the computer system to perform operations comprising:
    obtaining a first dataset comprising a first feature set of features;
    generating a synthesized set of synthesized features from the first feature set by providing the first dataset to feature primitive stacks that respectively corresponds to synthesized features of the synthesized set, wherein a feature primitive stack outputs a synthesized feature value for the synthesized feature corresponding to the feature primitive stack based on feature values of the first feature set;
    determining a set of covariance values, wherein the set of covariance values comprises a measure of covariance between pairs of features of the synthesized set of features:
    determining a set of eigenvectors based on the set of covariance values:
    extracting a reduced synthesized set from the synthesized set based on (i) the set of eigenvectors derived from the synthesized set and (ii) a count of correlation values between features of the synthesized set, wherein the correlation values satisfy a user-defined correlation threshold, and wherein each correlation value of the correlation values indicates a correlation between a respective pair of features of the synthesized set;
    generating a modified dataset from the first dataset based on the reduced synthesized set, wherein the modified dataset comprises at least one feature of the first feature set and at least one feature of the reduced synthesized set; and
    in response to validating the reduced synthesized set, storing the reduced synthesized set in a database in association with the first feature set, wherein validating the reduced synthesized set comprises determining that a second machine learning model trained on the modified dataset has greater accuracy than a first machine learning model trained on the first dataset.

2. The system of claim 1, wherein the synthesized set comprises a first synthesized feature, a second synthesized feature, and a third synthesized feature, the operations further comprising:
    in response to a determination that a first correlation value between the first synthesized feature and the second synthesized feature satisfies the user-defined correlation threshold, increasing the count of the correlation values by one.

3. The system of claim 2, wherein the operations comprise not increasing the count of the correlation values by one in response to a determination that a second correlation value between the second synthesized feature and the third synthesized feature satisfies the user-defined correlation threshold.

4. The system of claim 1, wherein the feature primitive stacks are first feature primitive stacks, the operations further comprising:
    determining the first feature primitive stacks;
    generating a first synthesized feature set using the first feature primitive stacks;
    determining a set of fitness scores based on classes of the dataset by determining a fitness score for each feature of the first synthesized feature set; and
    determining the first feature primitive stacks based on the set of fitness scores.

5. A method comprising:
    obtaining a first dataset comprising a first set of features;
    generating a second set of features based on the first set of features set by providing the first dataset to feature primitive stacks that respectively corresponds to features of the second set of features;
    determining a set of covariance values, wherein the set of covariance values comprises a measure of covariance between pairs of features of the second set of features;
    determining a set of eigenvectors based on the set of covariance values:
    determining a reduced feature set based on (i) the set of eigenvectors derived from the second set of features and (ii) a count of correlation values between features of the second set of features, wherein the correlation values satisfy a user-defined correlation threshold;
    generating a second dataset based on the first dataset and the reduced feature set; and
    in response to validating the reduced feature set, storing the reduced feature set in a database in association with the first set of features, wherein validating the reduced feature set comprises determining that a second machine learning model trained on the second dataset produces a learning model output that satisfies a set of criteria.

6. The method of claim 5, wherein generating the second set of features comprises:
    determining a measure of central tendency for a first feature of the first dataset, wherein the first dataset comprises a first data object;
    determining that a first feature value for the first feature of the first data object is empty;
    updating the first feature value based on the measure of central tendency; and generating a second feature value of the second set of features for the first data object based on the updated first feature value.

7. The method of claim 5, wherein generating the second set of features comprises:
determining that a feature value of a data object is empty, wherein the first dataset comprises the data object;
updating the feature value with a feature value prediction based on other feature values of the data object; and
generating a synthesized feature for the data object based on the feature value prediction.

8. The method of claim 5, and wherein the correlation values is a first set of correlation values, and wherein determining the reduced feature set comprises:
reducing the second set of features to generate a reduced second set of features based on the count of correlation values;
determining a second set of correlation values based on an aggregated collection of features comprising the first set of features and the second set of features; and
reducing the aggregated collection of features to generate the reduced feature set based on the first set of features, wherein the reduced feature set comprises at least one feature of the first set of features and at least one feature of the reduced second set of features.

9. The method of claim 5, further comprising:
obtaining a category associated with the first dataset; and
retrieving the feature primitive stacks based on the category.

10. The method of claim 5, wherein determining the reduced feature set comprises:
determining an associated set of eigenvalues based on the set of covariance values;
determining a feature vector based on the set of eigenvectors and the associated set of eigenvalues; and
determining the reduced feature set based on the feature vector and the count of correlation values.

11. The method of claim 10, wherein the set of covariance values comprises a measure of covariance between a feature of the second set of features and a feature of the first set of features.

12. A set of non-transitory, machine-readable media storing program instructions that, when executed by a set of processors, causes the processors to perform operations comprising:
obtaining a first dataset comprising a first set of features;
generating a second set of features based on the first set of features by providing the first dataset to feature primitive stacks that respectively corresponds to features of the second set of features;
determining a set of covariance values, wherein the set of covariance values comprises a measure of covariance between pairs of features of the second set of features;
determining a set of eigenvectors based on the set of covariance values;
determining a reduced feature set based on (i) the set of eigenvectors derived from the second set of features and (ii) a count of correlation values between features of the second set of features, wherein the correlation values satisfy a correlation threshold; and
storing the reduced feature set in a database in association with the first set of features based on a determination that a second dataset comprising the reduced feature set satisfies a set of criteria.

13. The set of non-transitory, machine-readable media of claim 12, wherein determining the reduced feature set comprises:

determining an aggregated collection of features comprising the first set of features and the second set of features; and
reducing the aggregated collection of features to generate the reduced feature set based on the first set of features based on the count of the correlation values, wherein the reduced feature set comprises at least one feature of the first set of features, and wherein the reduced feature set does not comprise any features of the second set of features.

14. The set of non-transitory, machine-readable media of claim 12, the operations further comprising:
obtaining a sequence of tokens;
generating a plurality of embedding vectors based on the sequence of tokens using a first neural network; and
determining a set of feature values for a data object representing the sequence of tokens by providing the plurality of embedding vectors to a second neural network, wherein generating the second set of features comprises determining a synthesized feature value of the second set of features based on the set of feature values.

15. The set of non-transitory, machine-readable media of claim 12, wherein determining the reduced feature set comprises:
determining a plurality of fitness scores associated with the second set of features;
selecting a first subset of the second set of features based on the plurality of fitness scores wherein the first subset does not include a non-selected feature of the second set of features; and
reducing the first subset of the second set of features using a feature extraction operation to determine the reduced feature set.

16. The set of non-transitory, machine-readable media of claim 15, wherein using the feature extraction operation comprises determining a dimension parameter of the feature extraction operation based on the count of the correlation values.

17. The set of non-transitory, machine-readable media of claim 12, wherein determining the reduced feature set comprises providing feature values of the reduced feature set to an autoencoder neural network.

18. The set of non-transitory, machine-readable media of claim 12, the operations further comprising indicating a candidate feature of the first dataset based on a determination that a count of feature values of the candidate feature that are empty does not satisfy a missing feature threshold, wherein generating the second set of features comprises generating the second set of features without using feature values of the candidate feature.

19. The set of non-transitory, machine-readable media of claim 12, wherein determining the reduced feature set comprises using a set of dimension-reducing operators to determine the reduced feature set based on the second set of features, the operations further comprising storing a set of identifiers representing the feature primitive stacks and the set of dimension-reducing operators.

20. The set of non-transitory, machine-readable media of claim 19, the operations further comprising:
obtaining a third dataset;
determining whether the third dataset comprises the first set of features; and
in response to a determination that the third dataset comprises the first set of features, retrieving the set of identifiers.

* * * * *